(12) United States Patent
Claeys

(10) Patent No.: US 11,836,570 B1
(45) Date of Patent: Dec. 5, 2023

(54) SYSTEM AND RELATED METHODS FOR OPTIMIZATION OF OPTICAL AND MACHINE-READABLE LABELS

(71) Applicant: Benjamin Paul J Claeys, Melsbroek (BE)

(72) Inventor: Benjamin Paul J Claeys, Melsbroek (BE)

( * ) Notice: Subject to any disclaimer, the term of this patent is extended or adjusted under 35 U.S.C. 154(b) by 0 days.

(21) Appl. No.: 18/136,478

(22) Filed: Apr. 19, 2023

Related U.S. Application Data

(60) Provisional application No. 63/449,070, filed on Mar. 1, 2023.

(51) Int. Cl.
*G06K 7/14* (2006.01)

(52) U.S. Cl.
CPC ......... *G06K 7/1482* (2013.01); *G06K 7/1417* (2013.01); *G06K 7/1443* (2013.01); *G06K 7/1447* (2013.01)

(58) Field of Classification Search
CPC ............................ G06K 7/1482; G06K 7/1417
USPC ..................................................... 235/462.01
See application file for complete search history.

(56) References Cited

U.S. PATENT DOCUMENTS

| | | | | |
|---|---|---|---|---|
| 2005/0224571 A1* | 10/2005 | Kelley | .................. | G06F 40/143 235/375 |
| 2007/0199992 A1* | 8/2007 | Manheim | ........... | G06K 7/10861 235/462.01 |
| 2007/0246542 A1* | 10/2007 | Manheim | ................. | G06K 5/00 235/487 |

* cited by examiner

*Primary Examiner* — Allyson N Trail

(57) ABSTRACT

The present invention relates to a system and method for optimizing the placement, size, scannability, and effectiveness of optical labels, such as 2D barcodes or machine-readable labels like QR codes, on a specified medium. The system comprises a set of servers configured to execute an artificial intelligence (AI) algorithm, a set of user devices, and a database. The AI algorithm analyzes uploaded images of intended mediums for optical label placement, determines optimal placement, size, and orientation of the optical labels, and calculates individual scores for visibility, scannability, and likelihood of being noticed by potential users for each suggestion, then combines these into an overall readability score. The invention offers a user-friendly, efficient, and objective approach to optimizing optical label placement that is particularly effective for addressing considerations for physical object mediums.

14 Claims, 2 Drawing Sheets

SYSTEM AND RELATED METHODS FOR OPTIMIZATION OF OPTICAL AND MACHINE-READABLE LABELS

FIELD OF INVENTION

The present invention relates generally to the field of graphic design, and more specifically to systems and methods for optimizing the placement, size, scannability, and effectiveness of optical labels in graphic design works.

BACKGROUND

In recent years, 2D barcodes or machine-readable optical labels, such as QR codes, have become ubiquitous in marketing and advertising materials. These codes enable consumers to access additional information, visit websites, or make purchases by scanning the code with their smartphones or other devices. As a result, there is a growing demand for effective barcode or label placement in graphic design works to maximize their scannability and call-to-action effectiveness.

Existing systems for placing 2D barcodes or labels often rely on manual analysis or trial-and-error approaches, which can be time-consuming and inefficient. In addition, these systems may not take into account the unique challenges of placing a 2D object on a 3D contoured surface, such as product packaging or billboards, which can result in suboptimal placement and decreased effectiveness.

Furthermore, current methods do not provide objective feedback or scoring to help designers understand the impact of their barcode placement decisions on scannability and overall effectiveness. This lack of guidance makes it difficult for designers to optimize their designs for maximum conversion potential.

Another limitation of existing systems is their lack of integration with popular design tools, such as Adobe Creative Cloud or Sketch. This makes it more challenging for designers to incorporate barcode or label optimization into their existing workflows, resulting in additional time and effort spent on manual adjustments.

Moreover, the current systems do not offer testing and validation services to ensure the barcode or label is optimized for maximum effectiveness in the intended medium and environment. This leaves designers with no means to verify the scannability and overall performance of their designs.

In light of these disadvantages, there is a need for a more efficient and effective system and method for optimizing the placement, size, scannability, and effectiveness of 2D barcodes or machine-readable optical labels in graphic design works, particularly on 3D contoured surfaces.

It is within this context that the present invention is provided.

SUMMARY

The present invention relates to a system and method for optimizing the placement, size, scannability, and effectiveness of optical labels, such as 2D barcodes or machine-readable labels like QR codes, on a specified medium such as a physical object and within digital images and videos. The system comprises a set of servers executing an artificial intelligence (AI) algorithm, a set of user devices, and a database. The AI algorithm is designed to analyze the uploaded images of physical objects or digital images and videos and determine the optimal placement, size, and orientation of the optical labels, taking into account the three-dimensional (3D) characteristics of the physical objects when applicable.

Individual scores for visibility, scannability, and likelihood of being noticed by potential users are calculated by the AI algorithm, and an overall readability score is generated for the suggested optical label placement. The system also generates tips and recommendations based on a combination of pre-determined suggestions and procedurally generated advice tailored to address unique issues detected by the AI algorithm.

The servers provide testing and validation services to ensure the optical label's effectiveness in the intended medium and environment. The user devices are configured to integrate with existing design tools via Application Programming Interfaces (APIs) for seamless compatibility with users' design workflows. This invention offers a user-friendly, efficient, and objective approach to optimizing optical label placement and helps marketers and designers improve their optical label usage, leading to increased scans and conversions.

BRIEF DESCRIPTION OF THE DRAWINGS

Various embodiments of the invention are disclosed in the following detailed description and accompanying drawings.

Figure 1:
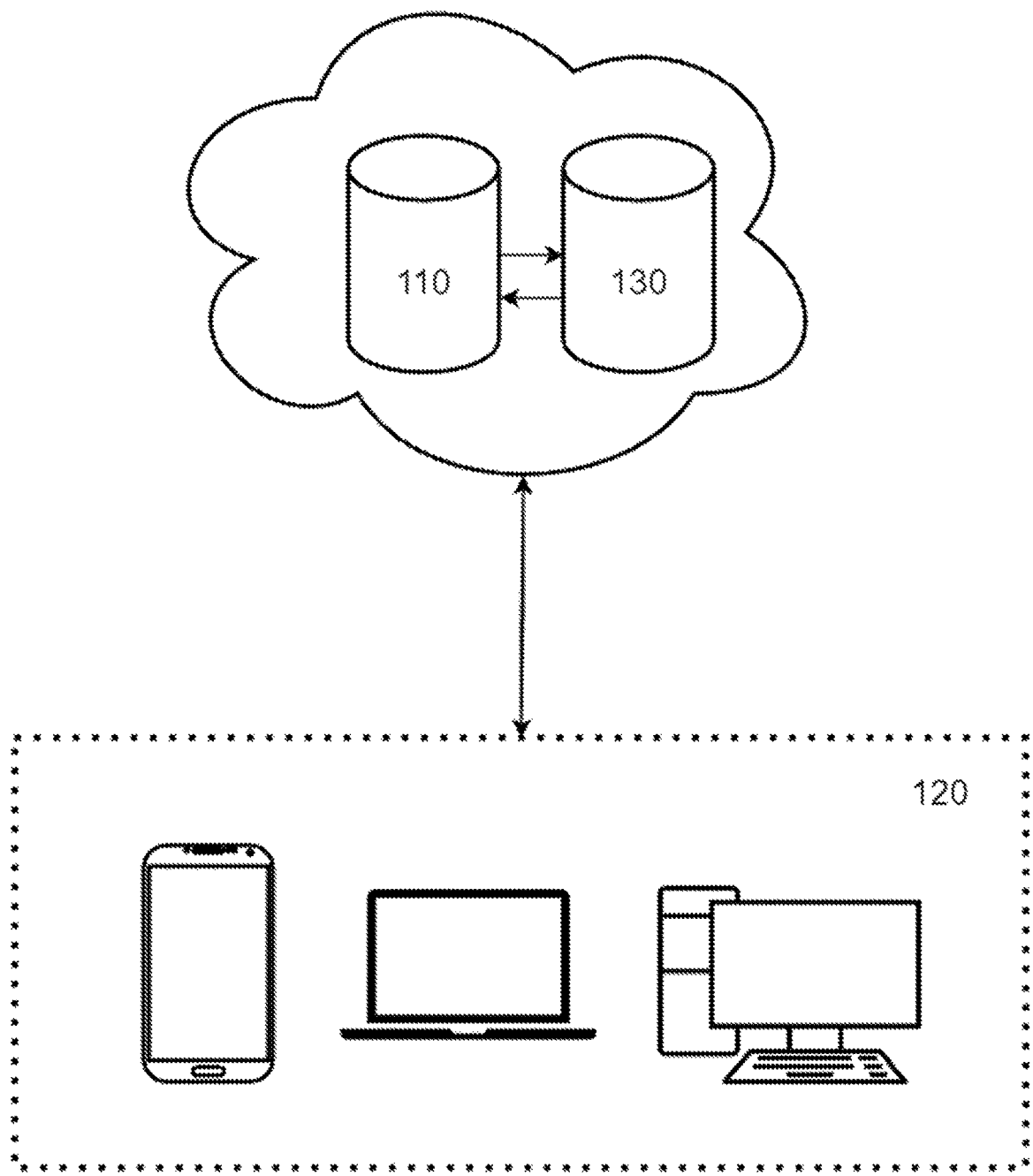
FIG. 1 shows the system components with the servers and the database in communication with each other and various user devices via a cloud network architecture.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention. As used herein, the term "and/or" includes any combinations of one or more of the associated listed items.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terminology used herein is for the purpose of describing particular embodiments only and is not intended to be limiting. As used herein, the singular forms "a," "an" and "the" are intended to include the plural forms as well, unless the context clearly indicates otherwise.

The system for optimizing the placement, size, scannability, and effectiveness of 2D barcodes or machine-readable optical labels in graphic design work may operate as an online platform accessible through personal devices over a, cloud network architecture in communication with a database. The system processes user requests for optimal code placement on a specified medium and provides suggestions based on the analysis of the provided images.

The system provides an intuitive user interface for account registration and management, allowing users to create and manage their profiles. Users can log into their accounts and access the platform to upload images of the medium on which a code is to be placed, along with additional details such as the intended medium and environment.

As shown in FIG. 1, the system comprises a set of servers (110) executing an artificial intelligence (AI) algorithm, a set of user devices (120), and a database (130). The AI algorithm is designed to analyze the uploaded images of physical objects or digital images and videos and determine the optimal placement, size, and orientation of the optical labels, taking into account the three-dimensional (3D) characteristics of the physical objects when applicable.

The servers (110) and database (130) co-operate to perform the following functions: Storing and managing of user account information, uploaded images, and associated metadata; Executing the AI algorithm for optimal barcode placement, size, and orientation analysis; Calculating individual scores for visibility, scannability, and likelihood of being noticed, and the overall readability score; Generating tips and recommendations based on the AI algorithm's analysis; Managing the testing and validation services for simulating and verifying barcode effectiveness; Handling API integrations with existing design tools.

The user devices (120) perform the following functions: User registration, login, and account management; Uploading images and inputting optimization request details; Displaying the AI-generated suggestions, scores, tips, and recommendations; Enabling the user to make design adjustments based on the platform's feedback; Integrating with the platform's APIs for seamless design tool compatibility.

Figure 2:
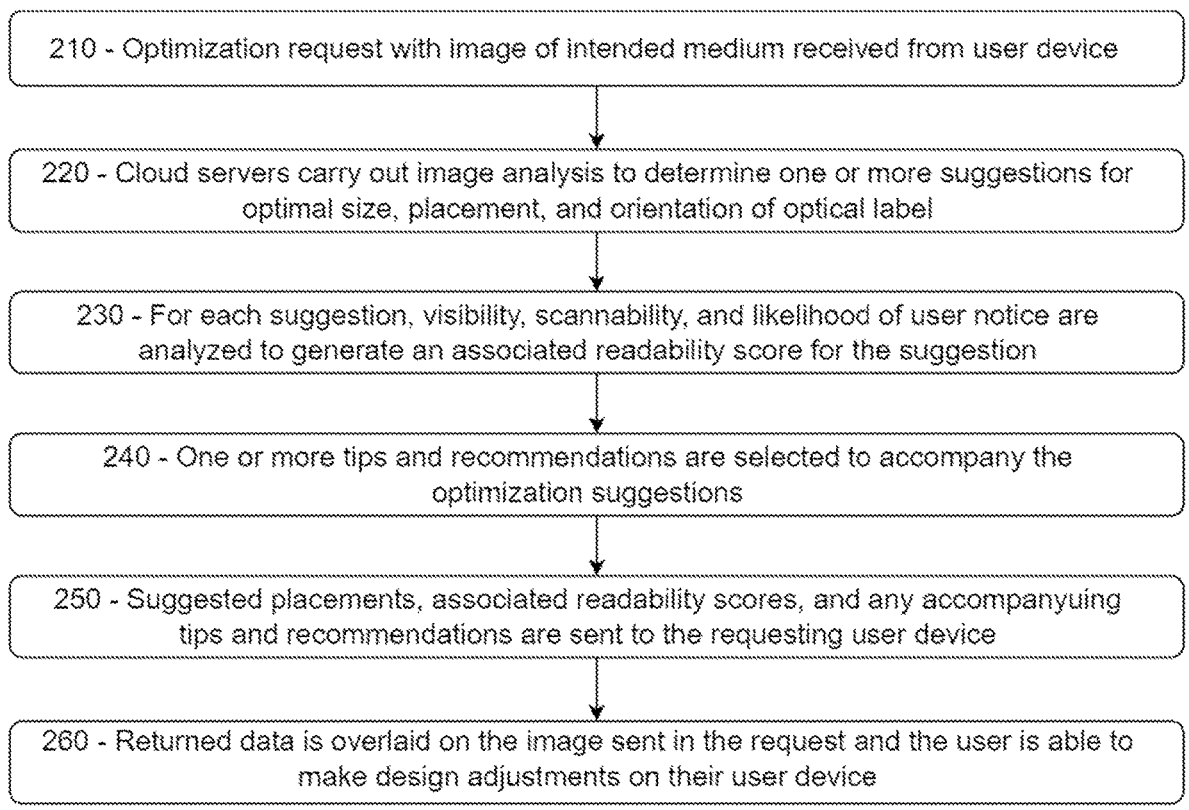
FIG. 2 shows a flow chart of the set of steps carried out by the cloud servers when an optimization request is received.

Referring to FIG. 2, a set of steps is shown as the system handles an optimization request in an example user journey:

The cloud servers receive an optimization request from a user device, which includes an uploaded image of a physical object or a digital image or video and optimization request details (step 210).

Upon receiving an image for analysis, the servers may pre-processes the image to enhance its quality and prepare it for the AI algorithm. This pre-processing may include:

Resizing the image to a standard size while maintaining aspect ratio

Adjusting brightness and contrast to enhance visibility

Applying filters to reduce noise or artifacts

Correcting for anti-aliasing distortion, which may affect the accuracy of the AI algorithm Once the image is pre-processed, the software extracts relevant features from the image, such as texture, color, and shape. These features are used to determine suitable areas for barcode placement, taking into consideration factors like visibility, scannability, and aesthetic appeal.

The AI algorithm is then executed on the servers to analyze the image and determine and suggest one or more optimal placements, sizes, and orientations of the optical label (step 220). This determination is made by considering the intended medium and other factors.

When a user submits an optimization request, providing the following factors could help the algorithm determine the optimal barcode placement: Intended medium (e.g., product packaging, billboards, posters, magazine pages, etc.); Environment where the medium will be used or displayed (e.g., retail store, outdoor advertisement, online publication, etc.); Target audience demographic information (e.g., age, interests, location, etc.); Specific design elements or constraints the user wants the algorithm to consider (e.g., branding guidelines, color schemes, etc.); Desired level of prominence for the barcode in the overall design (e.g., subtle integration or a prominent call-to-action); Operations Carried Out on the Cloud Network Architecture vs. User Devices.

For each of the suggested placements for the barcode or optical label the servers then calculate an associated readability score. The algorithm achieves this by calculating individual scores for visibility, scannability, and likelihood of being noticed by potential users and generates an overall readability score for the suggested optical label placement (step 230). The higher the score, the more effective the suggested placement is expected to be.

Each factor contributing to the overall readability score would be determined using separate scoring mechanisms.

Visibility: The AI algorithm would assess the contrast between the barcode and its background, the size of the barcode relative to the overall design, and the amount of white space surrounding the barcode. High contrast, appropriate size, and sufficient white space would result in a higher visibility score.

Scannability: The algorithm would evaluate the barcode's deformation, distortion, and potential occlusion due to the 3D nature of the product packaging. Minimal deformation, distortion, and occlusion would contribute to a higher scannability score.

Likelihood of Being Noticed: This score would be based on the prominence of the barcode in the overall design and its proximity to other attention-grabbing elements. A prominent placement and strategic positioning near key design elements would yield a higher likelihood of being noticed score.

The AI algorithm calculates the readability score by analyzing these factors using a weighted scoring system. For example, visibility may have a higher weight than scannability to ensure that the barcode is easily seen by users.

The server algorithm may also provide tips and recommendations along with the suggested placements, based on a combination of pre-determined suggestions and procedurally generated advice tailored to address unique issues detected by the AI algorithm (step 240).

The software would determine which tips and recommendations are appropriate for each case by analyzing the specific characteristics of the uploaded image, the barcode or optical label placement, and the intended medium and environment. For example, if the software detects that the barcode placement is too small or too close to other design elements, it may recommend increasing the size or adjusting the position for better visibility. It could also provide tips on printing based on the material of the intended medium. A pre-determined list of common tips and recommendations would be compiled based on best practices and expert knowledge in the field of barcode placement and design.

The suggested placements of the optical labels and their associated readability scores, along with any tips and recommendations, are then sent to the user device (step 250).

Users can then make design adjustments based on the platform's feedback and resubmit the adjusted design for further analysis (step 260). For example, users may be able to review the suggestions, make any desired adjustments to their designs, and resubmit the updated images for further analysis. To streamline the design process, the software may integrate with popular design tools like Adobe Creative Cloud or Sketch, allowing users to seamlessly incorporate the barcode or label optimization process into their existing design workflows. The system would likely have different APIs for integrating with the existing design tools.

An example user journey will now be described with reference to the process steps and system components for FIG. 1 and FIG. 2.

A user designing product packaging for a 3D piece of merchandise accesses the platform through their user device (120). They upload a photograph of the 3D object to the platform and input details about the intended medium, environment, and desired prominence of the QR code that will link town online offering of the merchandise vendor. The user device (120) sends the image and optimization request details to the cloud servers (110), as illustrated in FIG. 2, step 210.

Upon receiving the optimization request, the AI algorithm on the cloud servers (110) analyzes the uploaded image and optimization request details to determine the optimal placement, size, and orientation of the OR code, taking into account the 3D characteristics of the object (FIG. 2, step 220). The AI algorithm calculates individual scores for visibility, scannability, and likelihood of being noticed by potential users and generates an overall readability score for the suggested OR code placement (FIG. 2, step 230).

The AI-generated tips and recommendations, along with the suggestions and scores, are sent back to the user device (220) (FIG. 2, step 250). The user views the suggestions, scores, and recommendations overlaid on the image of the 3D object in the user interface. They can adjust the design based on the platform's feedback, and if needed, resubmit the adjusted design for further analysis (FIG. 2, step 260). The cloud servers (110) provide testing and validation services to ensure the OR code's effectiveness in the intended medium and environment (FIG. 2, step 270).

Throughout the user journey, the user device (120) can communicate with the cloud servers (110) and the database (130) to upload images, request optimization, receive AI-generated suggestions, scores, tips, and recommendations, and provide user feedback. The database (130) stores the relevant data, which can be used to improve the AI algorithm's performance and enhance the system's overall effectiveness.

Software Components

The database would need to store the following data for the system to function properly:
  User account information, including login credentials and preferences.
  Uploaded images and associated metadata, such as the intended medium and environment.
  Barcode or optical label placement suggestions, along with their respective readability scores.
  User feedback and design improvement data to continuously update and improve the AI algorithm.

The server software would need to employ a suitable machine learning algorithm, such as a Convolutional Neural Network (CNN) or a Support Vector Machine (SVM), to analyze the extracted features and predict the optimal placement and size of the barcode or optical label.

A CNN is well-suited for this application due to its ability to process and analyze images with high accuracy, while an SVM may provide a more efficient solution for large datasets. The choice of algorithm may depend on the specific requirements of the application, such as computational complexity and processing time.

The AI algorithm could be trained, for example, using supervised machine learning techniques. Supervised machine learning involves using a labeled dataset to teach the model to recognize patterns and make predictions based on input data. A labeled dataset containing images of various media with barcodes or optical labels in different placements, sizes, and orientations, along with their respective readability scores, would be used to train the model. This dataset could be collected from existing, marketing materials, user-generated content, or created by manually annotating images with optimal barcode placements.

The datasets used for training the AI algorithm could include:
  Images of different media (e.g., product packaging, billboards, posters, magazine pages, etc.) with barcodes or optical labels in various placements, sizes, and orientations.
  Readability scores associated with each image, determined by expert annotators or through user feed back.
  Additional metadata, such as the intended medium and environment, to provide context for the algorithm.

Network Components

A server as described herein can be any suitable type of computer. A computer may be a uniprocessor or multiprocessor machine. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, programmable control boards (PCBs), and other suitable hardware configured to perform the various functionality described throughout this disclosure.

Additionally, the computer may include one or more memories. Accordingly, the aforementioned computer systems may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data. In particular, the one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the system and related methods have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An optical label placement optimization system comprising:
    a set of servers configured to execute an algorithm for determining optimal placement, size, and orientation of optical labels on a specified medium, taking into consideration the three-dimensional characteristics of said medium;
    a set of user devices configured to communicate with said servers, enabling users to upload images of the physical objects or digital images and videos, input optimization request details, receive placement suggestions and readability scores for the optical labels;
    a database configured to store user account information, uploaded images and associated metadata, optical label placement suggestions, scores, and user feedback, as well as testing and validation results.

2. The system of claim 1, wherein the algorithm is configured to analyze the uploaded image and determine the optimal placement, size, and orientation of the optical label by considering factors including one or more of: intended medium, environment, target audience demographic information, specific design elements, and desired level of prominence.

3. The system of claim 1, wherein the algorithm calculates individual scores for visibility, scannability, and likelihood of being noticed by potential users, and generates an overall readability score for the suggested optical label placement.

4. The system of claim 1, wherein the algorithm is configured to generate tips and recommendations based on a combination of pre-determined suggestions and procedurally generated advice tailored to address unique issues detected by the AI algorithm in a given request.

5. The system of claim 1, wherein the servers are further configured to provide testing and validation services, simulating and verifying the effectiveness of the optical label in the intended medium and environment.

6. The system of claim 1, wherein the user devices are configured to integrate with existing design tools via Application Programming Interfaces (APIs) for seamless compatibility with users' design workflows.

7. The system of claim 1, wherein the user devices are configured to allow users to make design adjustments to the received placement suggestions within a user interface of the system.

8. A method for optimizing optical label placement on physical objects and within digital images and videos, the method comprising the steps of:
   receiving, at a server, an uploaded image of a physical object or a digital image or video and optimization request details from a user device;
   executing an algorithm on the server to analyze the image and determine optimal placement, size, and orientation of the optical label, taking into account the 3D characteristics of the physical object when applicable;
   calculating, by the algorithm, individual scores for visibility, scannability, and likelihood of being noticed, and generating an overall readability score; and
   sending the generated suggestions to the user device.

9. The method of claim 8, wherein the algorithm considers factors including intended medium, environment, target audience demographic information, specific design elements, and desired level of prominence in determining the optimal placement, size, and orientation of the optical label.

10. The method of claim 8, wherein the method further comprises generating tips and recommendations based on the algorithm's image analysis.

11. The method of claim 8, wherein the method further comprises receiving design adjustments from the user device.

12. The method of claim 11, wherein the method further comprises performing testing and validation of the adjusted design to ensure the optical label's effectiveness in the intended medium and environment.

13. The method of claim 8, wherein the generated tips and recommendations are based on a combination of pre-determined suggestions and procedurally generated advice tailored to address unique issues detected by the AI algorithm.

14. The method of claim 8, further comprising integrating the platform with existing design tools via APIs, allowing users to incorporate the optimized optical label placement into their existing design workflows.

\* \* \* \* \*